United States Patent [19]

Literati et al.

[11] Patent Number: 4,939,752
[45] Date of Patent: Jul. 3, 1990

[54] DISTRIBUTED TIMING RECOVERY FOR A DISTRIBUTED COMMUNICATION SYSTEM

[75] Inventors: Alan J. Literati; Edward J. Mooney, both of Westminster; Joseph S. Oliner, Denver, all of Colo.

[73] Assignee: AT&T Company, Murray Hill, N.J.

[21] Appl. No.: 359,314

[22] Filed: May 31, 1989

[51] Int. Cl.$^5$ ............................................. H04L 07/10
[52] U.S. Cl. ........................................ 375/107; 455/51
[58] Field of Search .................. 375/107; 370/16, 108; 455/51

[56] References Cited

U.S. PATENT DOCUMENTS

| 4,142,069 | 2/1979 | Stover | 370/103 |
| 4,399,531 | 8/1983 | Grande et al. | 370/60 |
| 4,736,393 | 4/1988 | Grimes et al. | 375/107 |

Primary Examiner—Benedict V. Safourek
Assistant Examiner—Tesfaldet Bocure
Attorney, Agent, or Firm—John C. Moran

[57] ABSTRACT

A timing control arrangement that dynamically controls the distribution of timing information in a distributed digital communication system having standard nodes and prioritized master nodes. Reference timing signals to control the system are distributed from the highest priority master node currently operational. Should a higher priority master node than the current master node become operational, the higher priority master node automatically takes control of the timing for the system. Each node is connected by links to at least one other node, and each node receives timing signals and a timing priority number (TPN) from all of the connected node. The TPN defines the number of links over which the timing signals travel to the receiving node from the current master node. Each standard node selects timing signals and TPN from the link having the lowest TPN and transmits the selected TPN (after incrementing the selected TPN by one) and timing signals on all connected outgoing links. When each master node becomes operational, the node transmits a TPN equal to M*N+1 where M is the priority number of each master node and N is equal to the number of links in the shortest path between the most distant nodes where distance is measured by counting the number of links between nodes. When a master node receives a TPN less than or equal to M*N, the master node enters the standby state and assumes the functions of a standard node since the received TPN indicates that a higher priority master node is controlling the timing of the system. However, if a standby master node receives on all connected links TPNs equal to a predefined maximum (which indicates that no master node is controlling the system), the standby master node assumes the functions of an active master node and starts to control the timing of the system.

23 Claims, 16 Drawing Sheets

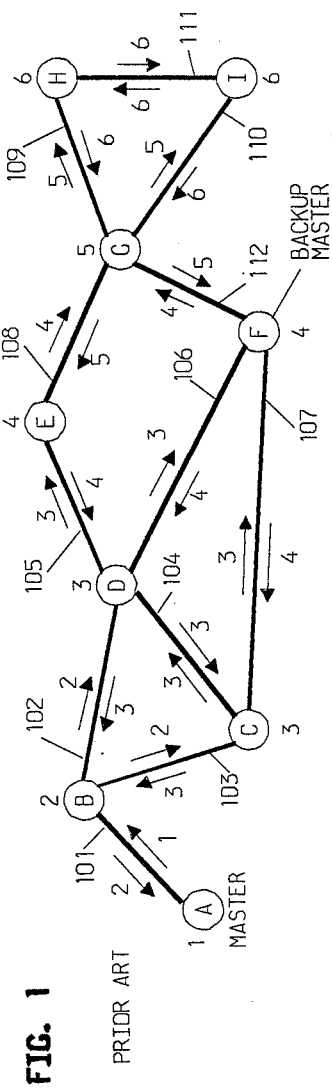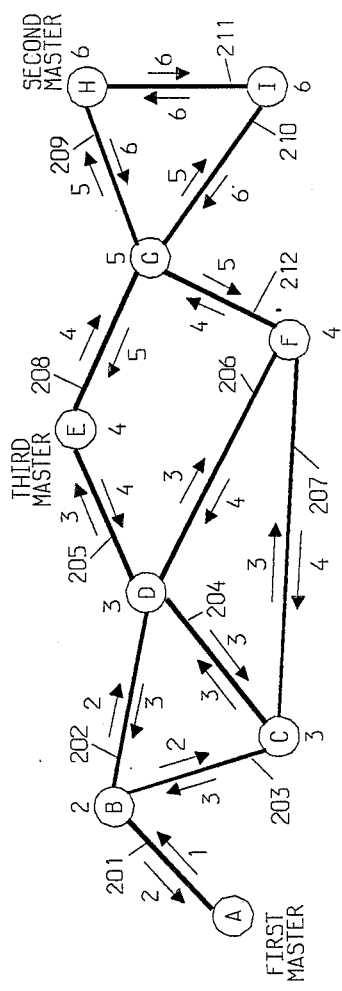
FIG. 1 PRIOR ART
FIG. 2
FIG. 7
| FIG. 3 | FIG. 5 |
| FIG. 4 | FIG. 6 |

TRANSMISSION OF THE TIMING PRIORITY NUMBER IN TIME SLOT 0

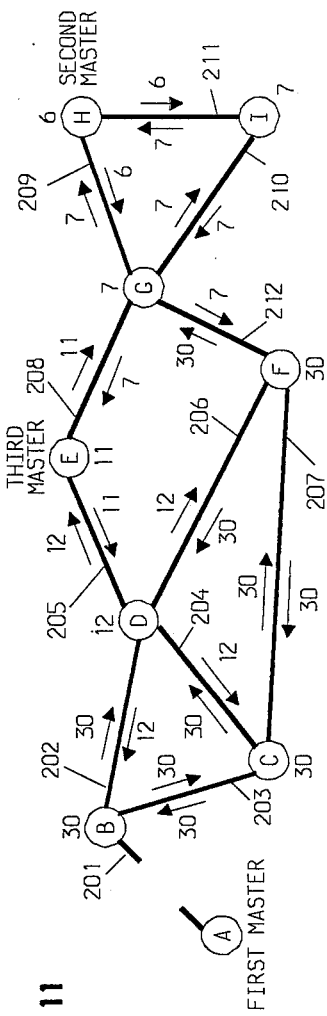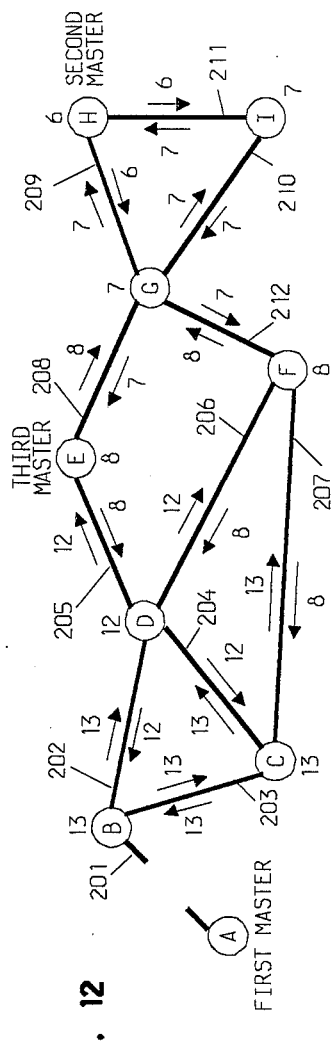
FIG. 11
FIG. 12

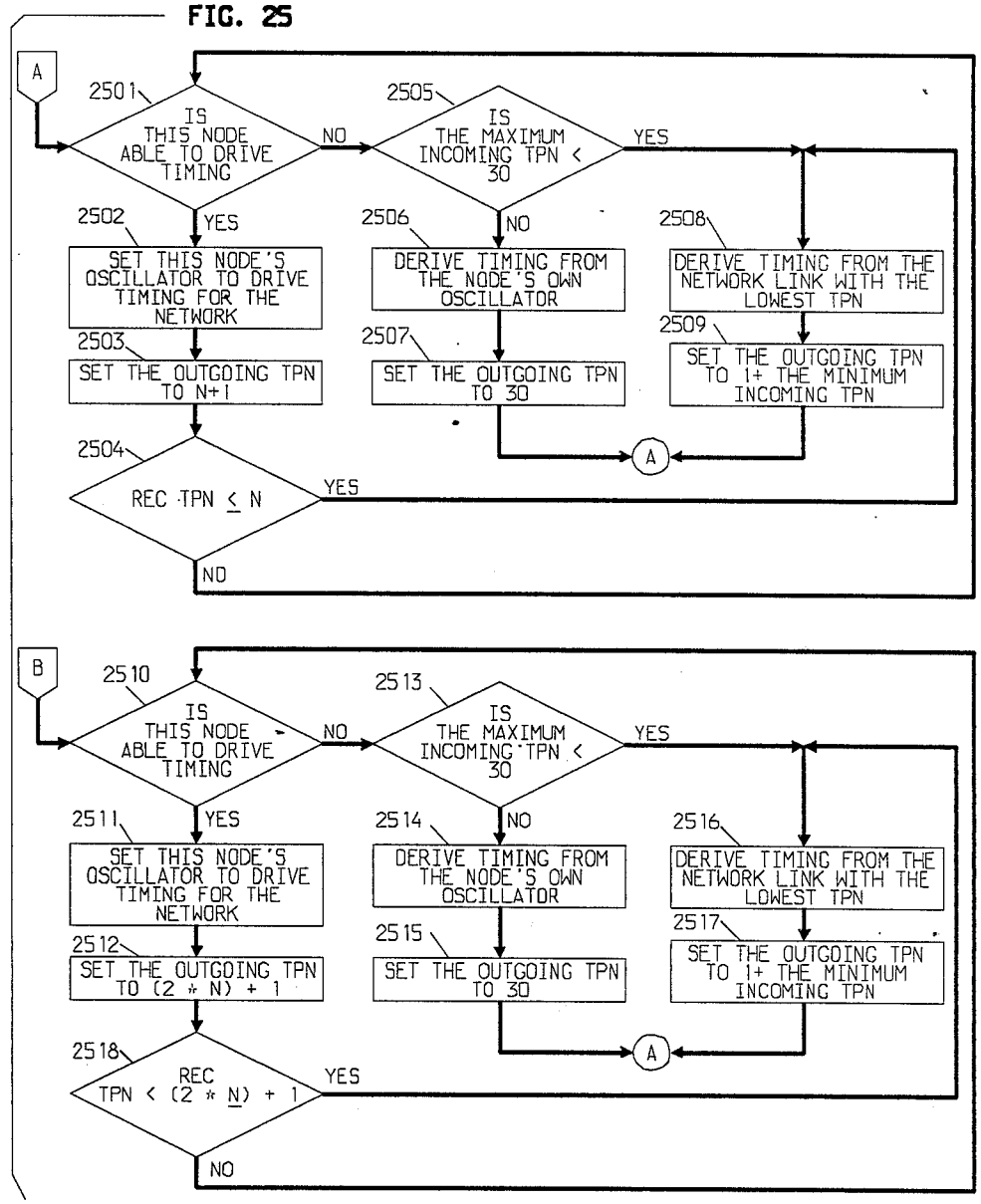

4,939,752

DISTRIBUTED TIMING RECOVERY FOR A DISTRIBUTED COMMUNICATION SYSTEM

TECHNICAL FIELD

This invention relates to a distributed digital system and more particularly, to improve facilities for recovery and reconfiguration of timing between the nodes of the digital system.

BACKGROUND OF THE INVENTION

It is necessary that all nodes of a distributed digital system, such as a digital switching or transmission system, have precisely synchronized timing so that voice and/or data signals can be transmitted error free between nodes. One way to achieve this timing precision is to transmit timing signals to all nodes from a master signal source so that the timing circuitry at all nodes is synchronized to the same signal. For reliability purposes, it is necessary that the system timing facilities have the capability of maintaining the internode synchronization at all times including circumstances in which the master signal source may fail or become otherwise unavailable.

U.S. Pat. No. 4,736,393 discloses a timing control arrangement the dynamically controls the distribution of timing information in a distributed digital communication system. A reference timing signal is distributed from a reference master node to all other nodes in the system. Each node is connected by links to at least one other node and each node receives timing signals from all the links to which it is connected. Each node selects one of these signals as its timing reference by scanning the various received timing signals to identify the one signal that is received via the shortest path to the master reference node. The path length is given by information specifying the number of intermediate nodes through which the timing signal has traveled from the reference node to reach the receiving node. The path length information is conveyed in a timing priority number (TPN).

FIG. 1 illustrates the system of this patent which is capable of having one master and one designated backup master. In FIG. 1, the nodes are interconnected by the indicated paths with the numbered arrows indicating the TPN number transmitted over the path in each direction. The number adjacent to each node indicates the TPN generated by the node and transmitted on all outgoing links. In FIG. 1, node A is the master node; and node F is the backup master. The network condition portrayed in FIG. 1 indicates that the master node is functioning properly to supply timing signals to the rest of the network.

The system of FIG. 1 functions in the following manner. Master node A generates and transmits a TPN of 1 to node B, as indicated by the arrow pointing in the direction of node B over path 101. Node B receives this TPN of 1, increments it by 1, and tranmits a TPN of 2 over paths 101, 102, and 103 to nodes A, D, and C, respectively. All of the nodes in the system perform similar incrementing and transmitting operations on received TPNs.

As long as master node A is active, the system remains in the stable state illustrated by FIG. 1. However, if link 101 fails, the remaining nodes in the system continue to increment and transmit the lowest received TPN on the ongoing links. For example, when link 101 fails, the lowest TPN that node B receives is a 3. Consequently, node B increments this 3 by 1 and transmit a 4 out on links 101, 102 and 103. The result is that the TPN numbers increase rapidly in magnitude until a predetermined TPN maximum is reached (which in the disclosed system is 30). When the maximum is reached, backup master F detects this fact and begins to source timing information for the system and to transmit a TPN of 1. The system will then arrive at a steady state with the timing information being supplied by backup master F.

When link 101 is repaired, master node A is placed back on line to supply timing information to the remainder of the system. Master node A also transmits a command to backup master node F to stop supplying the timing information for the system illustrated in FIG. 1. Upon receipt of this command, backup master node F ceases to supply the signaling information.

A problem with the aforementioned system is that it only allows for one master and one backup master node which potentially limits the overall reliability of the system if both the master and the backup master nodes should fail. In addition, it is necessary for the master node to transmit a message to the backup master node once the master node resumes supplying the timing information for the system. Whereas this is not a severe limitation, it does mean that the master node does need a record of which node has been designated the backup master node. If for some reason it is necessary to temporarily remove the backup master node from service, it is a problem to designate another node as the backup master node.

SUMMARY OF THE INVENTION

The above problems are solved and a technical advance is achieved by the provisions of an improved timing facility for a multinode digital system. These improved timing facilities allow for a plurality of prioritized master nodes and provide that a lower priority node automatically gives up controlling the timing for the system when a higher priority node becomes operational.

Each of the nodes is interconnected to one or more other nodes via links. When activated, each operational master node transmits reference clock signals to control the system and also a timing priority number (TPN). This TPN is equal to $M*N+1$ on links interconnecting each master node to other nodes, where M is the priority number of each master node and N is equal to the number of links in the shortest path between the most distant nodes where distance is measured by counting the number of links between nodes. The highest priority master node's M equals 0. Other than the master nodes, each of the other nodes in the system selects clock signals and a TPN from an incoming link whose TPN has the lowest magnitude. Each of the other nodes then transmits the selected clock signals and TPN (after incrementing the TPN by one) to other nodes directly connected to each node. Each master node's timing is controlled by clock signals received over a connecting link if the TPN received on that link is less than $M*N$. By controlling the master nodes in this manner, the highest priority operational master node is able to gain control of the timing for the system either when the whole system is first made operational or when the higher priority master node becomes operational after having been disabled.

If the current masster node controlling the system should fail, the remaining nodes transmit increasingly larger TPNs until the TPNs on all links have reached the predetermined maximum. When this state occurs, each non-master node selects an internal local oscillator to provide timing for each individual node and transmits a TPN equal to the predetermined maximum value. In response to maximum-value TPNs on all links, each operational master node transmits reference clock signals to control the system and a TPN equal to M*N+1 on connected links. However, each master node will switch to external clock signals from a connecting link upon that link's TPN being less than M*N. This system allows the highest priority operational master node to gain control of the system's timing.

BRIEF DESCRIPTION OF THE DRAWING

This invention may be better understood by a reading of the following detailed description thereof with reference to the following drawing in which:

FIG. 1 illustrates the network topology of a prior art sytem;

FIG. 2 illustrates a network topology of one possible system of nodes in accordance with the invention;

FIGS. 9 through 23 illustrate different states that the system of FIG. 2 can assume during automatic reconfiguration of the system due to failure and subsequent repair of master nodes; and FIGS. 24 and 25 illustrate, in flowchart, form the manner in which the circuitry at each node operates to generate a TPN in response to the various system conditions and states that may be encountered by the node.

DETAILED DESCRIPTION

Figure 3:
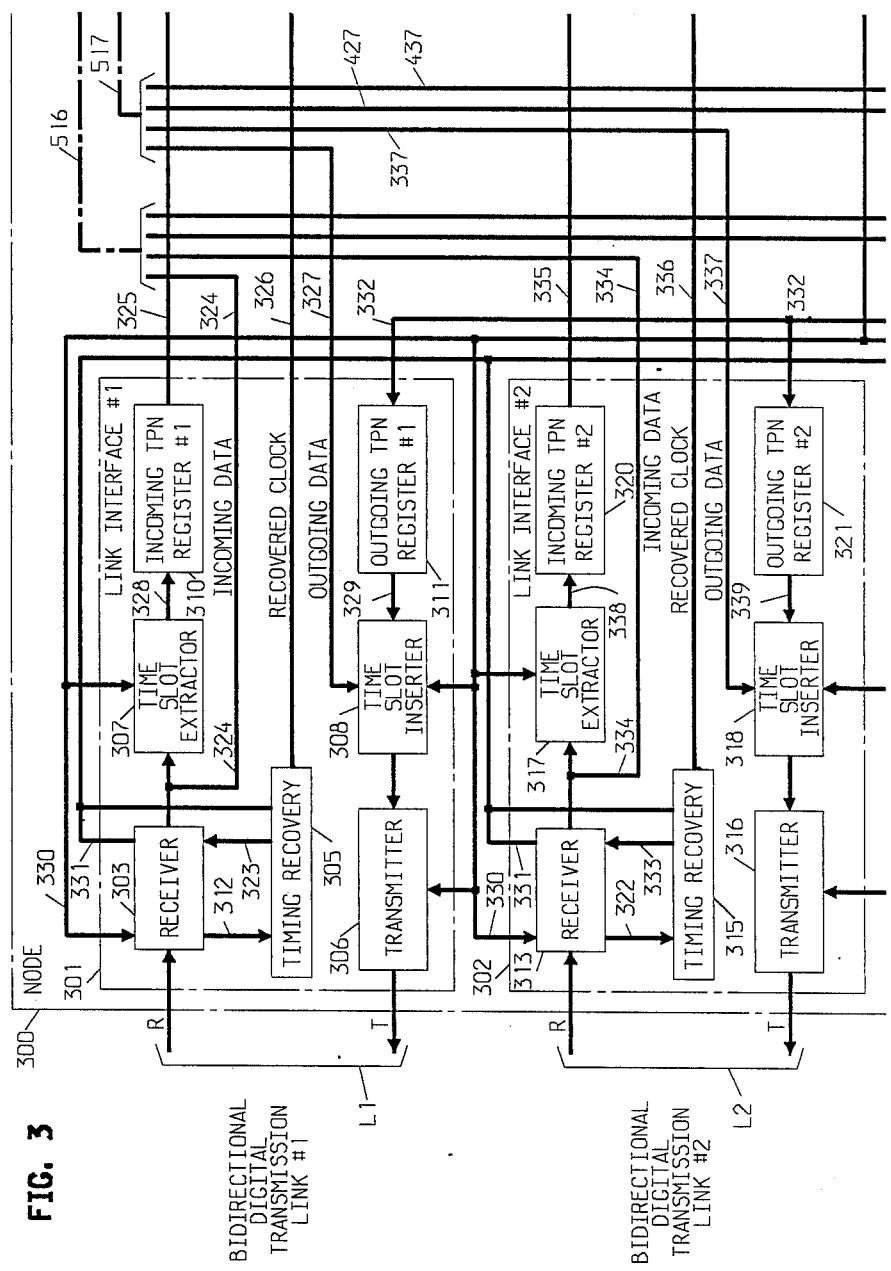
FIGS. 3, 4, 5, and 6 when arranged and shown in FIG. 7, disclose the details of the circuitry provided at a node.

The network topology of a system in accordance with the present invention is illustrated in FIG. 2 where the network comprises the nodes A, B, C, D, E, F, G, H and I. The nodes are interconnected by the indicated links/paths. Associated with each path are two TPNs transmitted over the path in each direction as indicated by the arrows. The number adjacent to each node indicates the TPN generated by the node and transmitted on all of its outgoing links.

In FIG. 2, node A is the first master node, node H is the second master node, and node E is the third master node. First master node A has the highest priority and an M equal to 0; second master node H has the second highest priority and an M equal to 1; third master node E has the third highest priority and M equal to 2. The network conditions as illustrated in FIG. 2 indicated that first master node A is functioning properly supplying timing signals to the rest of the network. In this stable state, first master node A generates and transmits a TPN of 1 to node B as indicated by the arrow pointing in the direction of node B over path 201. After node B receives this TPN of 1, node B increments the TPN by 1 and applies the resulting TPN of 2 over paths 201, 202, and 203 to nodes, A, D, and C, respectively. After node C receives the TPN of 2, node C increments the received TPN by 1 and transmits the resulting TPN of 3 to node D over path 204. Node D receives a TPN of 2 from node B and a TPN of 3 from node C. Node D also receives a TPN of 4 from each of nodes E and F. the TPN of 2 is the lowest TPN received by node D; therefore, node D increments the 2 by 1 and transmits the resulting TPN of 3 to each of nodes B, C, E and F.

Nodes F, G, H and I work in an analogous manner and receive and transmit the indicated TPNs. Each such node increments the lowest TPN it receives by 1 and transmits this incremented TPN to each node to which it is directly connected. Thus, node I receives a TPN of 5 as well as a TPN of 6. Since 5 is the lowest value of the two TPNs, node I increments 5 by 1 and transmits the resulting TPN of 6 to each of nodes G and H.

The circuitry of each node operates in such a manner that the timing of the node is controlled from the signals on the same path that transmits the lowest value TPN to the node. The details and operation of a node are illustrated in FIGS. 3 through 8. Thus, node D receives TPNs of 2, 3, and 4. Since 2 is the lowest received TPN, node D uses the signals on path 202 to control its timing. In the same manner, node I uses the signals on path 210 to control its timing rather than the signals on path 211. Using this algorithm, each node receives its timing reference signal either directly or indirectly from first master node A over the least number of paths possible. First master node A generates these timing signals from an internal local oscillator. Also, each node is prevented from supplying timing back to itself through the network, which would create timing loops and network timing instabilities.

In order to further explain the operation of the system of FIG. 2 in accordance with the invention, the following example is given to illustrate how master and non-master nodes function during automatic reconfiguration due to master nodes becoming inoperable, and subsequently operable. First, the example illustrates in FIGS. 9 through 13 the functions of the nodes when the first master node fails with all other nodes operational. Second, the example illustrates in FIGS. 13 and 14 the functions of the nodes when the second master node fails with the first master node inoperable but all other nodes operational. Third, the example illustrates in FIGS. 15 and 16 the functions of the nodes when the third master node fails with the first and second master nodes being inoperable but all other nodes operational. Fourth, the example illustrates in FIGS. 17 and 18 the functions of the nodes when the second master node becomes operational with the first and third master nodes inoperable but all other nodes operational. Fifth, the example illustrates in FIGS. 19 through 21 the functions of the nodes when the first master node becomes operational with the second master node operational, the third master node inoperable, and all other nodes operational. Finally, the example illustrates in FIGS. 22 and 23 the functions of the nodes when the third master node beomes operational with all other nodes operational.

The system timing remains in the state portrayed by FIG. 2 as long as all elements of the network, including master node A and path 201 remain operable and supply the required timing signals to node B. If path 201 fails, node B no longer receives a TPN of 1 from node A. In this case, a TPN of 3 is the lowest value TPN received by node B. Node B increments the 3 by 1 and generates a TPN of 4 which is transmitted to nodes C and D. Each of the nodes C and D increment the received TPN of 4 and transmit a new TPN of 5 back to node B. Node B in turn increments 5 by 1 and returns a new TPN of 6 to nodes C and D. This process continues with respect to nodes B, C, and D so that increasingly higher value TPNs are generated. The remaining nodes of the network follow in an analogous manner and they also generate increasingly higher value TPNs. Finally, the system reaches the state illustrated in FIG. 9 where all nodes are transmitting and receiving a maximum TPN, which illustratively may be 30.

Figure 9:
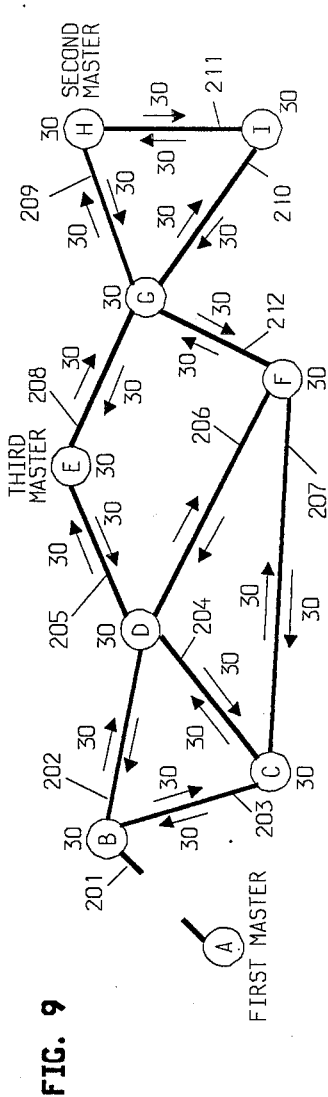

Once any node receives the maximum TPN, the node does not increment the received TPN but continues to transmit the maximum TPN on all outgoing links. In addition, the node relies on an internal local oscillator for timing. Once the steady state condition illustrated in FIG. 9 is obtained, both second master node H and third master node E transmit the necessary timing signals on their outgoing links to control the system. Second master node H transmits a TPN of 6 on outgoing links 209 and 211. Third master node E transmits a TPN of 11.

Figure 10:
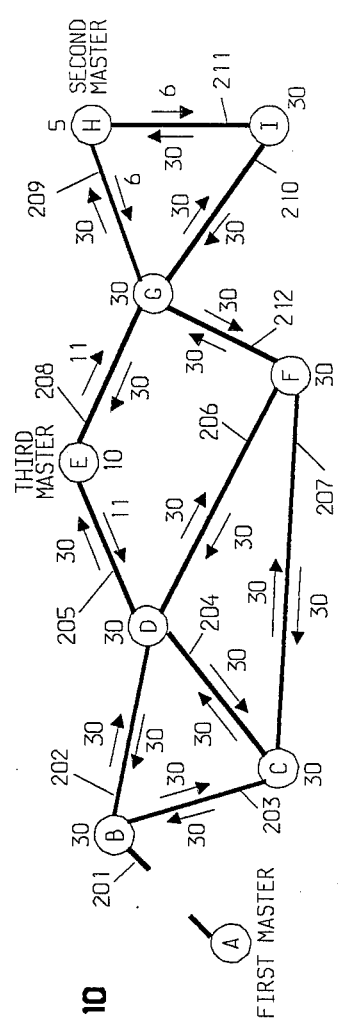

In general, the master nodes generate and transmit a TPN equal to M*N+1 where M is the priority number of the master node. In the present example, first master node A, second master node H, and third master node E have priority numbers equal to 0, 1, and 2, respectively. N is equal to the number of links in the shortest path between the most distant nodes where distance between nodes is measured by counting the number of links between the nodes. N equals 5 for the present example. FIG. 10 illustrates the TPNs transmitted during the next TPN phase. FIG. 11 illustrates the second TPN transmission. Once the third master node E receives the TPN of 7 from node G, node E immediately stops transmitting timing signals, utilizes the timing information received via link 208, and starts transmitting a TPN of 7+1 on its outgoing links as illustrated in FIG. 12. In general, master nodes assume the functions of a nonmaster node when a received TPN is equal to or less than M*N which indicates that a master node of higher priority is controlling the system. Eventually, the system stabilizes to the state illustrated in FIG. 13 where second master node H supplies all of the timing information to all nodes of the system with the exception of master node A which has been severed from the system due to a failure of link 201.

Figure 13:
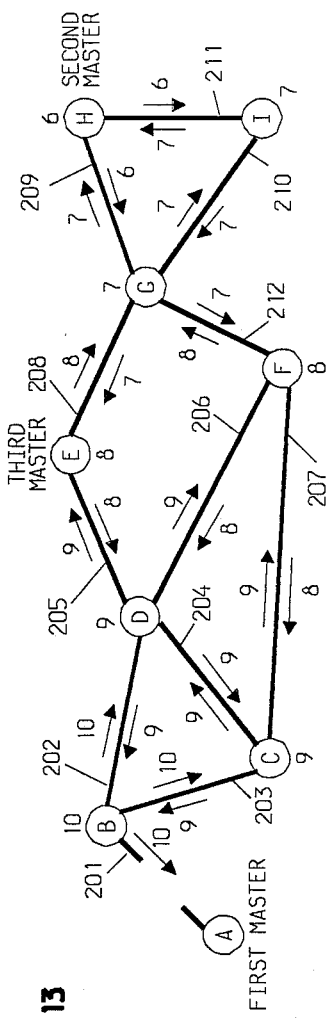
Figure 14:
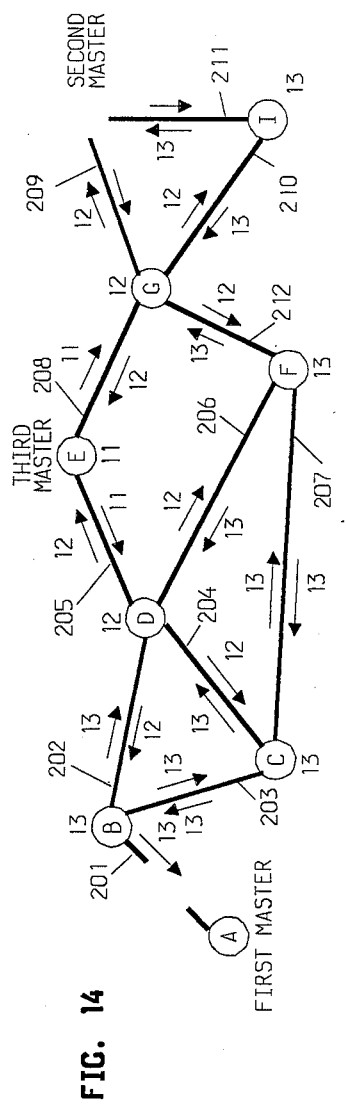

Once the system has achieved the steady state condition illustrated in FIG. 13, and second master node H fails, the nodes increment the TPNs until each TPN equals to 30. At this point third master node E transmits timing information to control the system and a TPN of 11. The system eventually stabilizes as illustrated in FIG. 14.

Figure 15:
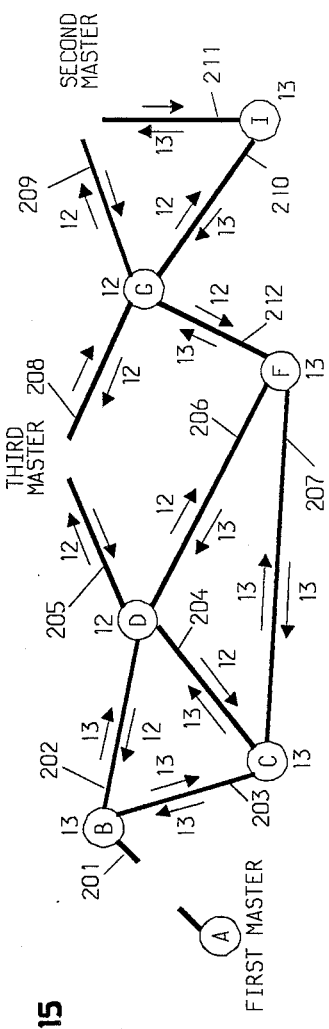
Figure 16:
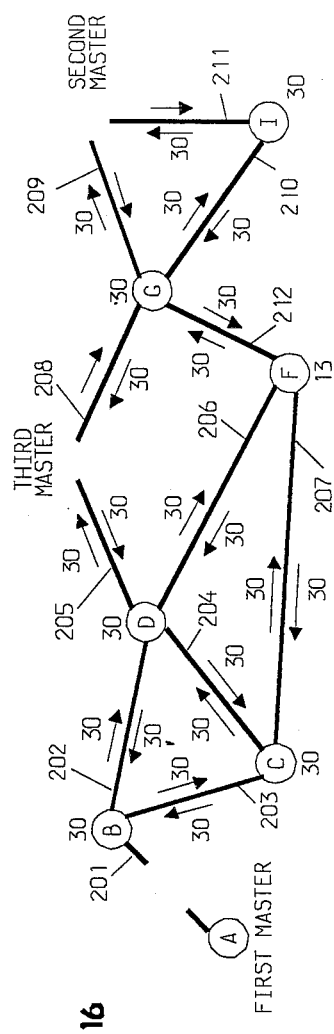

If third master node E fails as illustrated in FIG. 15, all operational nodes once again increment received TPNs and output these incremented TPNs on their outgoing links. Since there are no longer any master nodes capable of assuming the generation of timing signals for the system illustrated in FIG. 15, the system eventually stabilizes as illustrated in FIG. 16. Each node then relies on its own internal local oscillator to generate its timing signals and transmits a TPN equal to 30 on all outgoing links.

Figure 17:
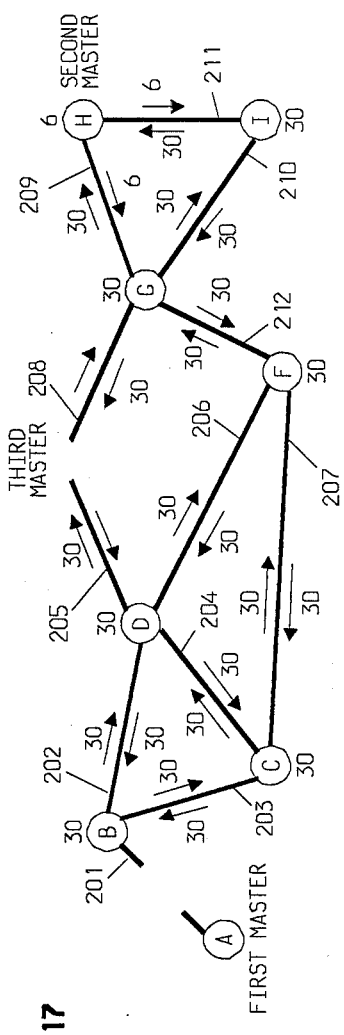
Figure 18:
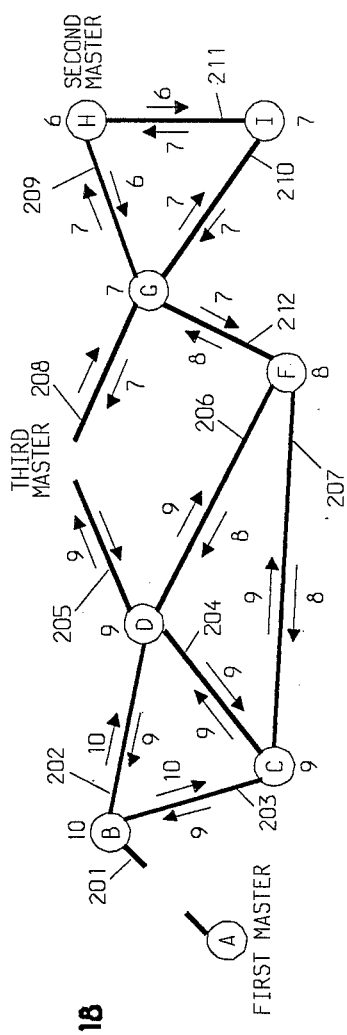
Figure 19:
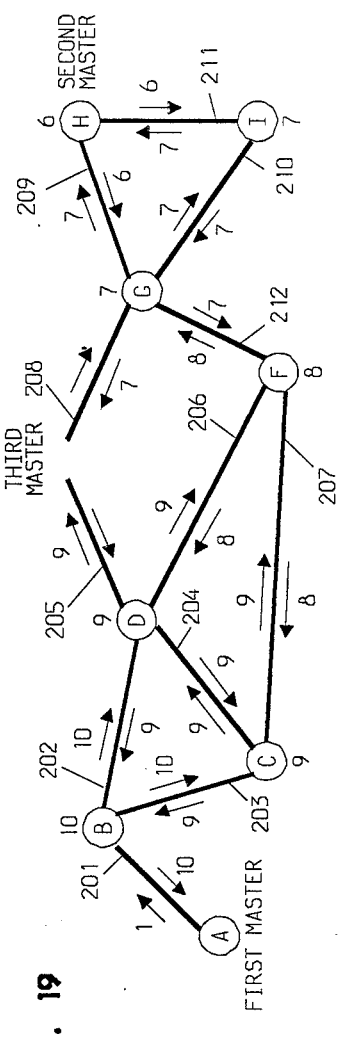

Now assume that second master node H becomes operational as illustrated in FIG. 17. When second master node H becomes operational, it outputs a TPN of 6. The non-master nodes utilizes the timing signals from second master node H and eventually reach the stable state illustrated in FIG. 18. In FIG. 18, the system utilizes the timing signals from second master node H to achieve synchronization. Both the first and third master nodes are inoperable. .p FIG. 19 illustrates the state of the system when first master node A first becomes operational. First master node A immediately sends out timing signals and transmits a TPN equal to 1. As illustrated in FIG. 19, both first master node A and second master node H are now operational, each transmitting a TPN and timing signals to control the system. Third master node E is not operational at this point.

Figure 20:
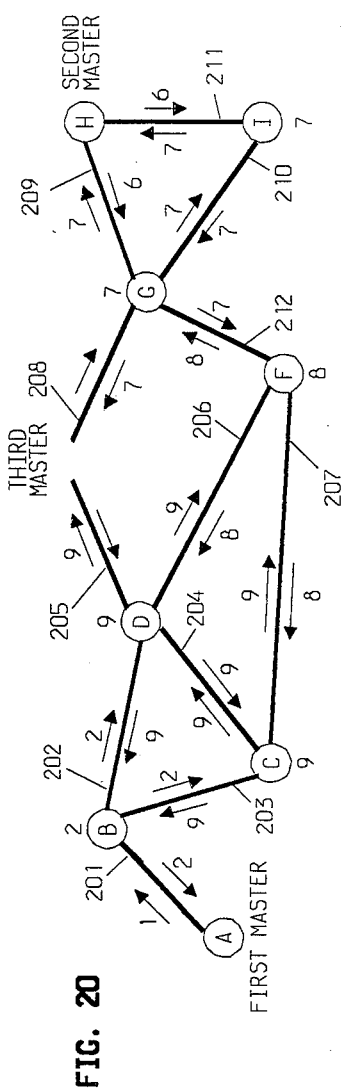
Figure 21:
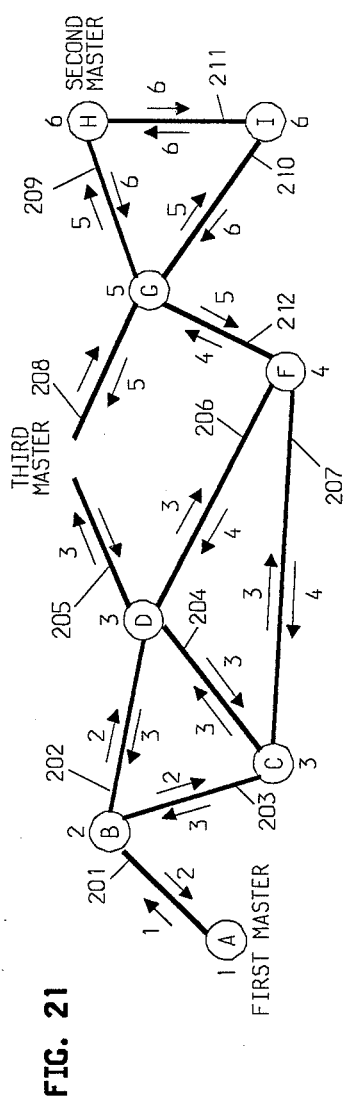

FIG. 20 illustrates the next progression of first master node A assuming control of the system since it is transmitting a lower TPN than second master node H. The nodes in the system continue to accept the timing information from first master node A as each in turn receives a lower TPN accompanying the timing information from first master node A than the TPN accompanying the timing information from second master node H. Both the first and second master nodes continue to transmit internally generated timing signals and TPNs until the state of the system illustrated in FIG. 21 occurs. Once second master node H receives a TPN of 5 from node G via link 209, second master node H stops outputting internally generated timing signals and accepts timing signals received via link 209 from first master node A. At this point, all the nodes in the system are receiving the timing signals from first master node A.

Figure 22:
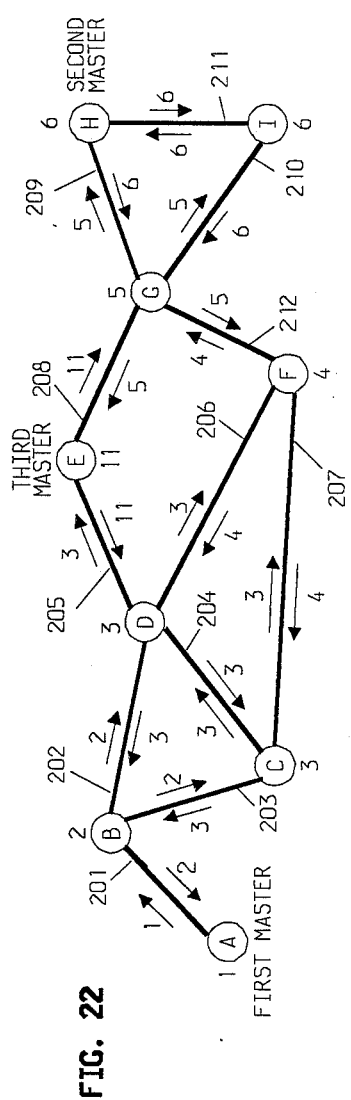
Figure 23:
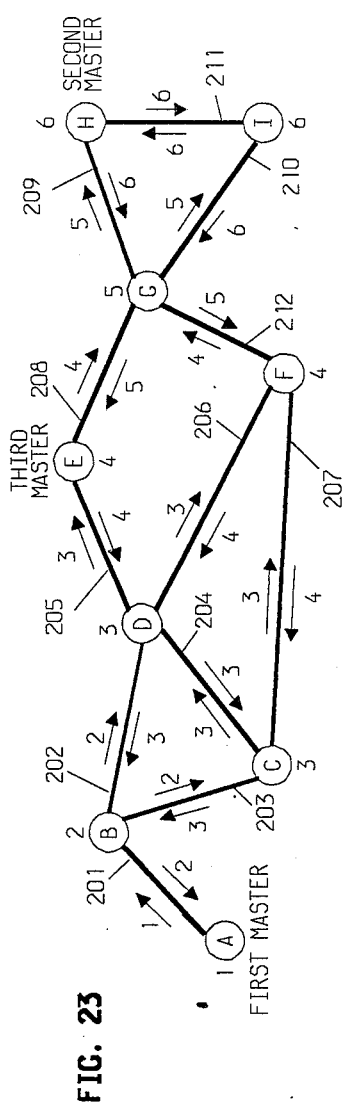

FIG. 22 illustrates the state of the system when third master node E becomes operational. Third master node E initially transmits internally generated timing signals and a TPN equal to 11 when it first becomes operational. However, on the next TPN phase, third master node E recognizes the TPN of 3 on link 205 and ceases to internally generate timing signals and a TPN; and third master node E begins to accept its timing signals from link 205 (supplied indirectly by first master node A). The system achieves a steady state as illustrated in FIG. 23 where master node A supplies all the timing signals.

Figure 4:
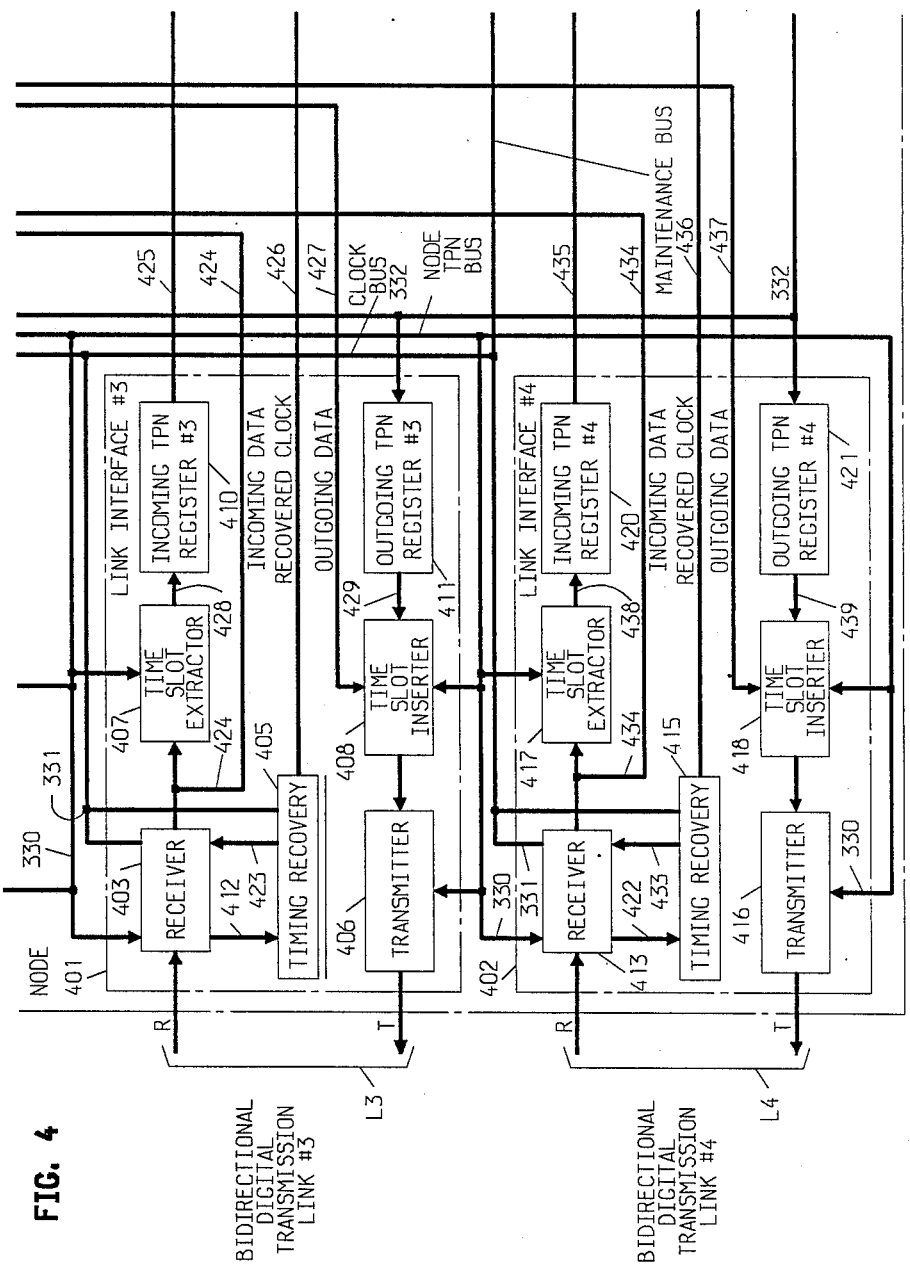

FIGS. 3, 4, 5 and 6, when arranged as shown in FIG. 7, disclose the circuitry comprising a typical node of FIG. 2. The node 300 on FIGS. 3 through 6 comprise a plurality of line interfaces 301, 302, 401 and 402 each of which terminates one of the links or paths to which the node is connected. The function of the equipment of a node is to receive information from a connected link and to apply information to the connected link. The bidirectional links on the left side of FIGS. 3 and 4 are designated L1, L2, L3, and L4. These links comprise the paths of FIG. 2 connected to the node portrayed by FIGS. 3 through 6. For example, node D of FIG. 2 is connected to the four paths 202, 204, 205 and 206 and therefore, these four paths correspond to the bidirectional links designated L1 through L4 on the left side of FIGS. 3 and 4. Only nodes D and G of FIG. 2 are connected to four paths. The remaining nodes are connected to either one path, two paths or three paths. For a node connected to only one path, only one of the links L1 through L4 would be connected to only one path, only one of the links L1 through L4 would be connected on FIGS. 3 and 4. Similarly, less than all of the links L1 through L4 on FIGS. 3 and 4 would be used for the other nodes of FIG. 2 that are conntected to less than four paths.

In addition to the link interfaces 301, 302, 401 and 402, each node comprises a digital switching or transmission system 501, a clock system 503, and a node controller 601. The digital switching system or transmission system 501 comprises the equipments at the node that receives the data or information, other than the TPN information, that is transmitted over the network between nodes. If the network of FIG. 2 represents a telephone network, then the element 501 would comprises a digital switching system such as a digital central office or a digital PBX wherein each central office or PBX serves a plurality of connected subscriber stations. On the other hand, if the network of FIG. 2 represents a digital transmission system, then element 501 would comprise a digital system serving a plurality of digital transmission facilities. In addition, the network of FIG. 2 could represent a combination of PBXs and digital transmission facilities.

Clock system 503 comprises a precision oscillator 505 and a timing source selector switch 504 which permits the timing of equipments at the node to be referenced to either the local precision oscillator 505 or to a clock signal recovered from the data applied to the node over any of the connected bidirectional links L1 through L4. The node controller 601 is a microprocessor controlled element having a microprocessor 610 and a plurality of registers and timers which operate under microprocessor control to control the clock system 503 so that the equipments of the node 300 operate under control of a preferred clock signal in accordance with the present invention. The operation of the node 300 and the node controller 601 is subsequently described in detail in connection with the flowcharts of FIGS. 22 and 23.

Figure 8:
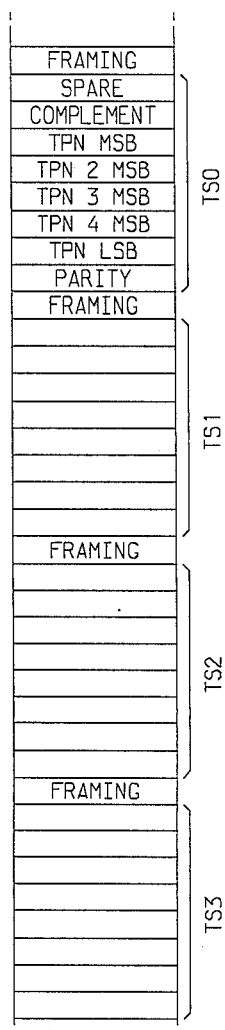
FIG. 8 discloses the protocol used to transmit the TPNs over the system paths.

With respect to link interface 301, conductor R of link L1 carries the signals applied to node 300 and these signals are applied to receiver 303. These signals are divided into discrete timeslots as shown in FIG. 8 Receiver 303 receives these timeslot signals and applies them over its output on path 324 to timeslot extractor 307. Timeslot extractor 307 extracts the TPN information from the bits of timeslot 0 and applies this information over path 328 to incoming TPN register #1 which is also designated as element 310. This TPN is applied over path 325 from register 310 to the A register 616 of node controller 601. Each of registers 616–619 comprises A and B sections. The signal applied to receiver 303 is also extended over path 312 to timing recovery element 305 which recovers the clock signal embedded in the received data on the R path of link L1. This clock signal is extracted and applied over path 326 to contact 2 of timing source selector switch 504 of clock system 503. Recovered clock is also applied over path 323 to receiver 303. Clock maintenance information is applied over path 331 to the receiver maintenance and interface registers 615. Path 331 comprises a maintenance bus and one of its functions is to supply register 615 with information indicating whether receiver 303 is receiving valid data and whether timing recovery element 305 is receiving valid data and whether timing recovery element 305 is successful in recovering good timing from the signal received by receiver 303 from link L1.

Figure 5:
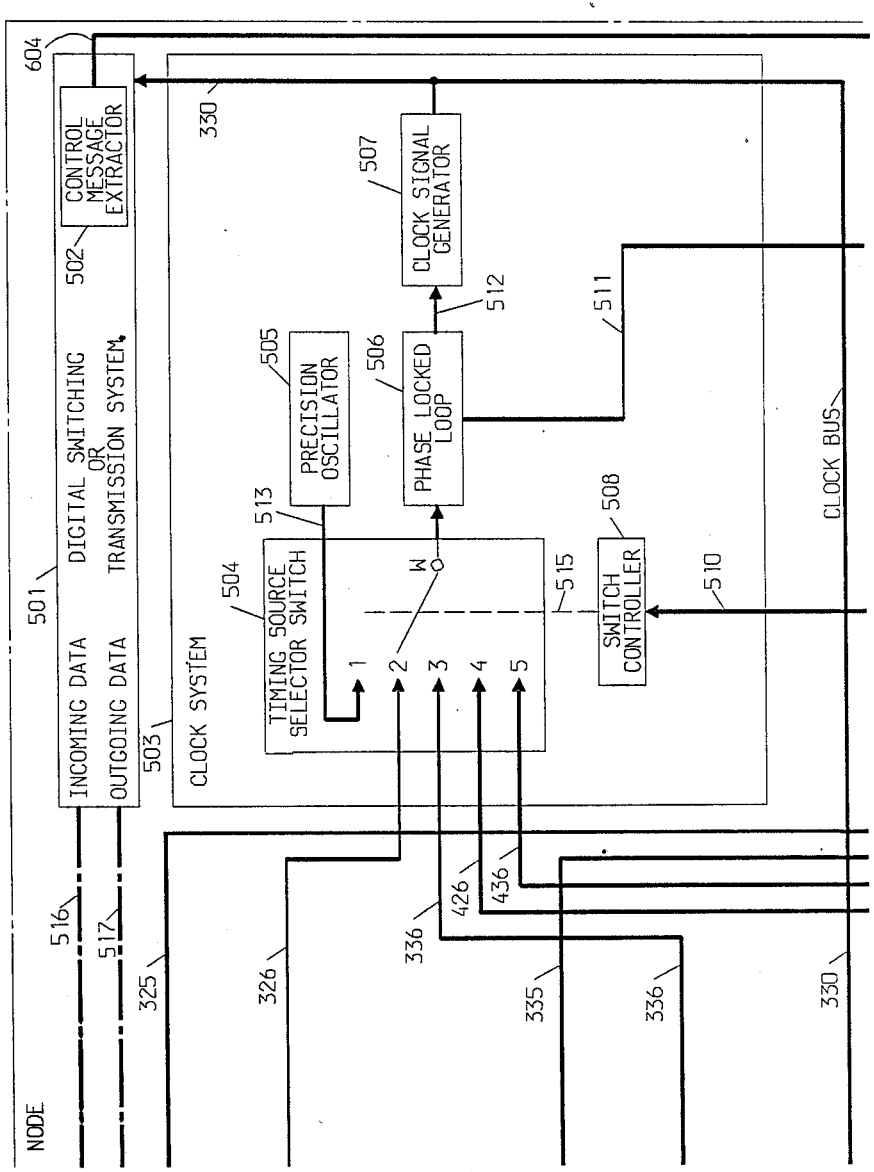

Path 330 extends from the clock signal generator of the clock system on FIG. 5 to the link interface units on FIGS. 3 and 4. On FIG. 3, path 330 connects to timeslot extractor 307 and receiver 303. Path 330 carries the clock signal that controls the operation of the node and therefore, the clock signal on path 330 controls the receiver 303 and the timeslot extractor 307. The signal from the R lead of link L1 is clocked into the receiver 303 using the recovered clock applied on path 323 and the incoming data on path 324 is clocked out of the receiver 303 using the clock signals applied on path 330 from the clock system 503 of FIG. 5

The output of receiver 303 is also extended over path 324 and cable 516 to the input of the digital switching or transmission system 501. This path carries all the timeslot signals on incoming path R of link L1 and applies them to the digital switching or transmission system 501. Thus, system 501 receives all of the timesolt signals applied to receiver 503 while incoming TPN register 310 receives only the timeslot 0 signals representing the TPN that is transmitted over path L1 to the node represented by the circuitry of FIGS. 3 through 6.

Digital Switching or Transmission System 501 applies the data it wishes to transmit to another node to cable 517 and from there to the link interface and link that is to extend this data to the other node. Let it be assumed that the data is to be transmitted over link L1. In this case, the data from system 501 is applied to path 327 where it is inserted into a signal comprising a series of timeslots as on FIG. 8. Timeslot inserter 308 also receives from element 311 the TPN that is to be transmitted in timeslot 0. Inserter 308 combines the timeslot data on path 327 with the TPN on path 329 and applies the resultant signal stream to transmitter 306 for transmission over path T of link L1 to the node connected to other end of the link. The timeslot inserter receives the node clock signal on path 330. The clock signal on path 330 is also extended to transmitter 306 to control its operation and this clock signal is embedded in its data stream for recovery at the node which terminates it. The TPN that is to be transmitted from the node over link L1 is stored in register 620 and extended over path 332 to the outgoing TPN register 311 for line interface 301. The outgoing TPN information is inserted into register 311 and applied by this register over path 329 to timeslot inserter 308. Inserter 308 inserts the outgoing TPN into timeslot 0 and inserts the information on path 327 into the remainder of the timeslots of each frame generated by link interface 301. The timeslots of each generated frame are applied from inserter 308 to transmitter 306 which in turn extends them over path T of link L1 to the node of the network connected to the other end of link L1.

Figure 6:
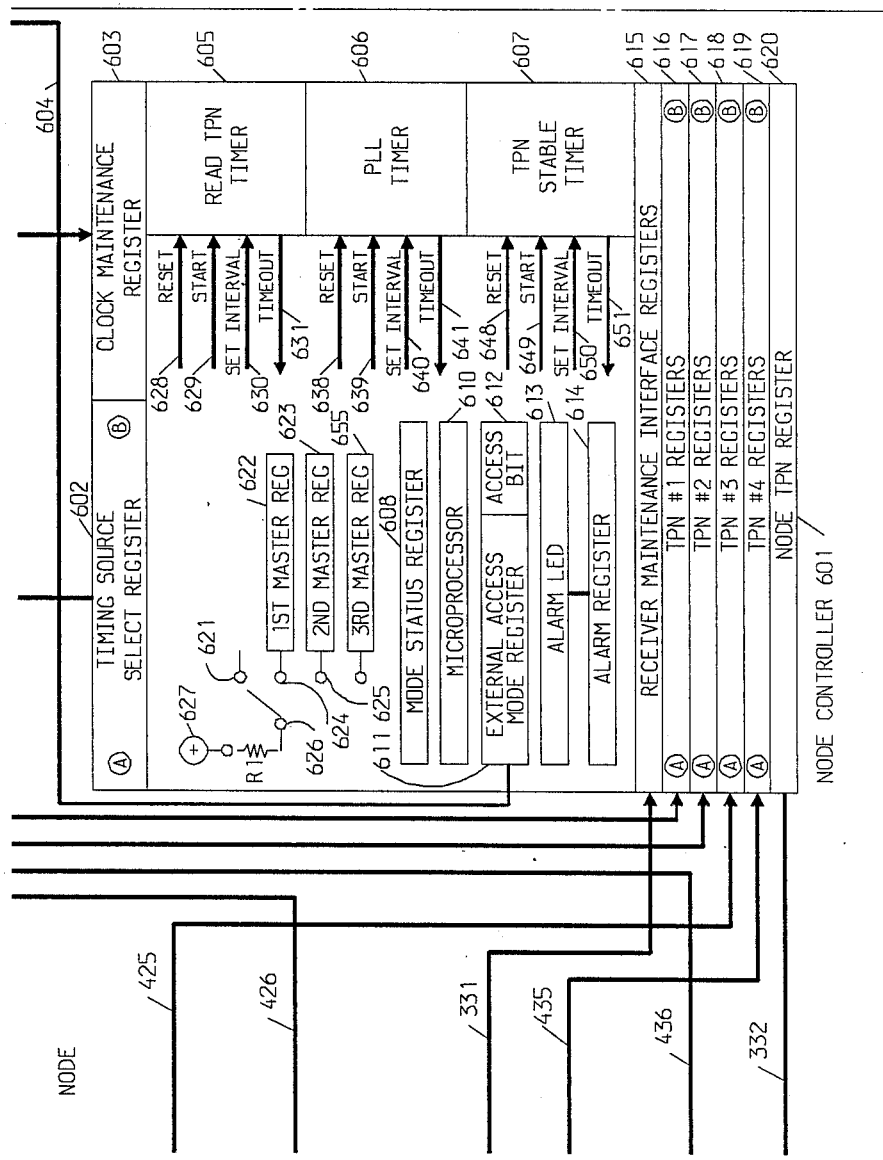
Figure 24:
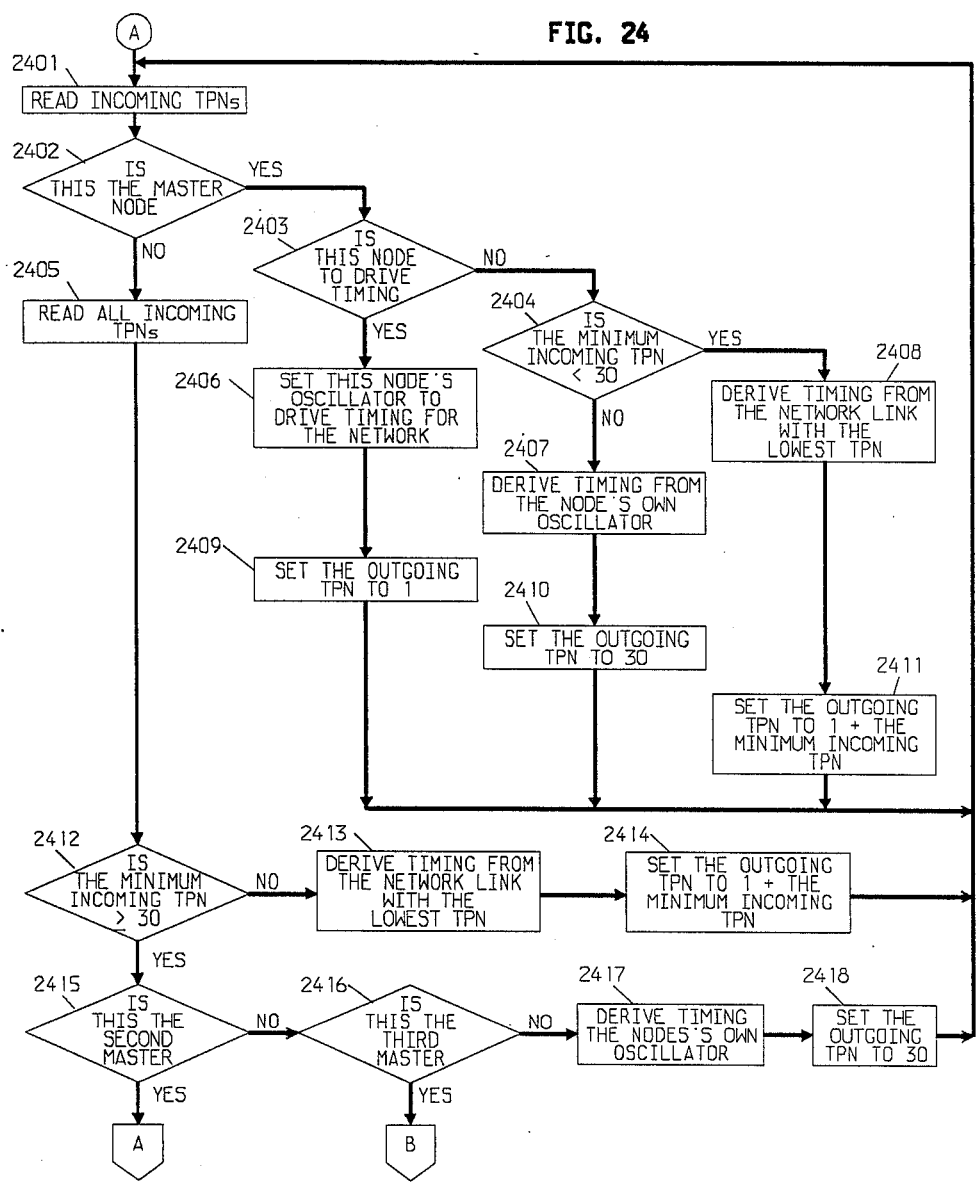

FIGS. 24 and 25 illustrate the program executed by microprocessor 610 of FIG. 6 in controlling the various nodes to perform the task previously described. Each node illustrated in FIG. 2 is capable of executing all portions of the flowcharts shown in FIGS. 24 and 25. The master of non-master status is determined by the contents of registers 622, 623, and 655 of FIG. 6. The utilization of other registers illustrated in FIG. 6 is given in greater detail in U.S. Pat. No. 4,736,393 which is hereby incorporated by reference. Each node first reads the incoming TPNs utilizing block 2401 and then checks to see whether the node is designated as a master node by execution of decision block 2402. In the present example if the node is first master node A, then decision block 2403 determines whether the node is capable of driving the system. If the node is capable of driving the system, then blocks 2406 and 2409 supply the necessary timing information to the network and outpulse a TPN of 1. If first master node A is not capable of driving the network, then decision block 2404 determines whether or not one of the other master nodes is supplying timing information by examining the incoming TPNs to determine if any are less than 30. If another master node is driving the system, then blocks 2408 and 2411 are executed whereby first master node A derives its timing from information on an incoming link and outputs a TPN equal to the incoming TPN plus 1. If no other master nodes are applying timing signals to the network, then blocks 2407 and 2410 are executed whereby first master node A relies solely on its own internal oscillator and transmits a TPN of 30 on all outgoing links.

If the node implementing the flowcharts illustrated in FIGS. 24 and 25 is not a master node, then blocks 2405 and 2412 are executed. Decision block 2412 determines if there is a node supplying timing information to the system by checking to see if any of the incoming TPNs are greater than or equal to 30. If an incoming link has a TPN of less than 30, then blocks 2413 and 2414 are executed whereby the node derives its timing information from an incoming link and outputs a TPN equal to the lowest received TPN plus 1.

If the node is receiving a TPN greater than or equal to 30 on all links, which indicates that no master node is supplying timing signals to the newtwork, then the node must determine whether it is a second or third master node or a non-master node. Decision blocks 2415 and 2416 determine whether the node is a second or third master node. If the node is a non-master node, blocks 2417 and 2418 are executed whereby the node simply derives timing information from its own oscillator and outputs a TPN equal to 30 on all its outgoing links.

Decision block 2415 determines whether the node is a second master node on the basis of register 623 of FIG. 6. If the node is a second master node, then decision block 2501 of FIG. 25 determines whether this master node is capable of supplying the system. If the second master node is capable of supplying timing to the system, blocks 2502 and 2503 are executed. After execution of these two latter blocks, the second master node remains in a loop comprising blocks 2501, 2502, 2503, and 2504. This loop continues until decision block 2504 detects that an incoming link has a TPN less than N+1. This condition indicates that the first master node has once again started supplying the timing signals to the system. When this condition is met, blocks 2508 and 2509 are executed.

If the second master node cannot supply timing to the system, then decision block 2505 is executed to determine whether an incoming link has a TPN less than 30 which, of course, indicates that another node is supplying timing signals to the network. In the present system, this other node would be the first or third master node. If this condition (all incoming TPNs≧30) does not exist, then blocks 2506 and 2507 are executed. However, if another node is supplying timing signals to the network, then blocks 2508 and 2509 are executed.

If the node is not a second master node, control is passed from decision block 2415 to decision block 2416 which determines whether or not the node is a third master node. If the latter condition is met, then decision block 2510 of FIG. 25 is executed. Decision block 2510 determines whether or not the node is capable of supplying timing signals to the system. If the node is capable of supplying timing signals to the system, blocks 2511 and 2512 are executed such that the node derives timing information for the system from an internal local oscillator and outputs a TPN of 11. The third master node remains in the loop of blocks 2510, 2511, 2512, and 2518 until either the first or second master node starts to supply timing information to the system. Block 2518 determines when this condition occurs. If the third master node is not capable of supplying timing signals to the network, decision block 2513 is executed to determine whether or not there is an incoming link that has a TPN less than 30. If this condition (at least one TPN<30) is met, then blocks 2516 and 2517 are executed. Otherwise, blocks 2514 and 2515 are executed.

The system of FIG. 2 also functions by the non-master nodes and masters nodes functioning as non-master nodes decrementing rather than incrementing received TPNs. The controlling master node generates a TPN equal to M*N+a−1 where M and N are as previously defined and "a" is a predefined number. Advantageously, "a" equals 20 for the system of FIG. 2. The highest priority master node's M equals the highest value of M. Advantageously, first master node's M equals 2 for the system of FIG. 2. For the system of FIG. 2 if the controlling master node failed, the standby master nodes start to control the system's timing when received TPNs are less than or equal to a predefined number which could advantageously be 0. A lower priority master node relinquishes timing control to a higher priority master node when the lower priority master node receives a TPN greater than M*N+a−2.

While a specific embodiment of the invention has been disclosed, variations within the scope of the appended claimes are possible and are contemplated. There is no intention of limitation to what is contained in the abstract or the exact disclosure herein presented. The above-described arrangements are only illustrative of the application of the principles of the invention. It is to be expected that other arrangements will be devised by those skilled in the art without departing from the spirit and the scope of the invention.

We claim:

1. Apparatus for use in a multinode system of the type in which each node receives, from each other node to which each is directly connected, (a) a clock signal and (b) an associated input timing priority number (TPN), and in which each node transmits, to said each other node, (a) the particular received clock signal having the lowest associated TPN and (b) an output TPN, the TPNs being such that, at any particular time, the clock signal from a particular node, a current one of a plurality of master nodes becomes distributed to each of the other nodes as a current master clock signal, each of said plurality of master nodes being prioritized in accordance with an assigned master priority number, the higher priority node having the lower master priority number with the highest priority node having the lowest master priority number, said apparatus including, at each individual one of said plurality of master nodes of the system:

means for operating said individual node in a master mode in which its output TPN is a predetermined number which is a function of a predetermined mastr priority number assigned to that node, means for operating said individual node in a mode other than said master mode in which its output TPN is a function of the TPN associated with said particular received clock signal, means for switching said individual node to its master mode upon the disappearance of said current master clock signal from said system, and means responsive to the receipt of a TPN which is smaller than said TPN predetermined number for thereafter switching said individual node back to its other than said master mode, whereby said multinode system converges to a stable state in which an operative one of said master nodes having the highest priority operates in its master mode as said current master node and each other of said master nodes operates in its other than said master mode.

2. The apparatus of claim 1 wherein said plurality of master nodes are prioritized; and said means for operating said individual node in said master mode comprises means for generating said predetermined number equal to M*N+i where i is a predefined number and M is the master priority number of said individual node and N is equal to the number of links in the shortest path between the most distant nodes where distance is measured by counting the number of links between nodes.

3. The apparatus of claim 2 wherein said means for operating said individual node in said other than said master mode comprises means for adding i to said TPN associated with said particular received clock signal.

4. An apparatus for controlling the timing of each node in a multinode system wherein a clock source in one of a plurality of prioritized master nodes provides a reference clock signal for all other nodes in said system and the higher priority node of said plurality of prioritized master nodes has the lower priority number with the highest priority node having the lowest priority number, comprising:

means for interconnecting each of said nodes to one or more other ones of said nodes via links;

means for transmitting clock signals between each of said nodes directly interconnected by any one of said links;

means for activating one of said plurality of prioritized master nodes to provide reference clock signals for controlling the timing of said multinode system;

means for including a timing priority number (TPN) of M*N+i in the clock signals sent from said one of said plurality of prioritized master nodes to all of said nodes directly connected to said one of said plurality of prioritized master nodes by any one of said links where i is predefined number and M is the priority number of said one of said plurality of prioritized master nodes and N is equal to the number of links in the shortest path between the most distant nodes where distance is measured by counting the number of links between nodes;

means for operating all others of said nodes, other than said one of said plurality of prioritized master nodes, that receives a TPN so that all others of said nodes alter the received TPN by adding the number i to the received TPN and transmitting the altered TPN with clock signals to each node to which it is directly connected by any one of said links;

means for operating each node that receives more than a single TPN, other than said one of said plurality of prioritized master nodes, to select one of said received TPNs as a preferred received TPN;

means for controlling the timing of each node, other than said one of said plurality of prioritized master nodes, from clock signals transmitted over the link that applies the preferred TPN to said controlled node; and means for controlling the timing of said one of said plurality of prioritized master nodes from clock signals transmitted over a connected link upon the TPN received from said connected link being less than M*N thereby allowing another one of said plurality of prioritized master nodes having higher priority to control the timing of said system upon said other one of said plurality of prioritized master nodes becoming operational.

5. The apparatus of claim 4 wherein said means of activating said one of said plurality of prioritized master nodes, comprises:

means for detecting that all TPNs received by said one of said plurality of prioritized master nodes are equal to or greater than a predefined maximum value thereby indicating that none of said plurality of prioritized master nodes are controlling the timing of said systems; and means for providing clock signals for controlling said multinode system in response to the detection that all TPNs are greater than said predefined maximum value.

6. The apparatus of claim 5 wherein said means of controlling the timing of each node, other than said plurality prioritized master nodes, comprises:

means for detecting that all TPNs received by each node, other than said plurality of prioritized master nodes, are equal to or greater than said predefined maximum value;

means for selecting an internal local oscillator to provide timing for each node in response to the detection of all TPNs being equal to or greater than said predefined maximum value; and means for transmitting a TPN equal to said predefined maximum value on each of said links connected to each node in response to the detection of all TPNs being equal to or greater than said predefined maximum value.

7. The apparatus of claim 4 further comprises: means for initializing said other one of said plurality master nodes to control the timing of said system by generating and transmitting a TPN equal to M*N+i where M is the priority number of said other one of said plurality of prioritized master nodes.

8. An apparatus for controlling the timing of each node in a multinode system wherein a clock source in one of a plurality of prioritized master nodes provides a reference clock signal for all other nodes in said system and the higher priority node of said plurality of prioritized master nodes has the lower priority number with the highest priority node having the lowest master priority number, comprising:

means for interconnecting each of said nodes to one or more other ones of said nodes via links;

means for transmitting clock signals between each of said nodes directly interconnected by any one of said links;

means for activating said plurality of prioritized master nodes to each provide reference clock signals for controlling the timing of said system;

means for including a timing priority number (TPN) of M*N+i in the clock signals sent from each of said plurality of prioritized master nodes to all of said nodes directly connected to each of said plurality of prioritized master nodes by any one of said links where i is a predefined number M is the priority number of each of said plurality of prioritized master nodes and N is equal to the number of links in the shortest path between the most distant nodes where distance is measured by counting the number of links between nodes;

means for operating all others of said nodes, other than said plurality of prioritized master nodes, that receives a TPN so that all others of said nodes alter the received TPN by adding the number i to the received TPN and transmit the altered TPN with clock signals to each node to which it is directly connected by any one of said links;

means for operating each node that receives more than a single TPN, other than said plurality of prioritized master nodes, to select one of said received TPNs as a preferred received TPN;

means for controlling the timing of each node, other than said plurality of prioritized master nodes, from clock signals transmitted over the link that applies the preferred TPN to said controlled node; and means for controlling the timing of each of said plurality of prioritized master nodes from clock signals transmitted over a connected link upon the TPN received from said connected link being less than M*N thereby allowing the one of said plurality of prioritized master nodes having the highest priority to gain control of the timing of said system.

9. The apparatus of claim 8 comprises:

means for detecting that all TPNs received by another one of said plurality of prioritized master nodes are equal to or greater than a predefined maximum value thereby indicating that none of said plurality of prioritized master nodes are controlling the timing of said system; and means for providing clock signals for controlling said system by said other one of said plurality of prioritized master nodes in response to the detection that all TPNs are greater than said predefined maximum value.

10. The apparatus of claim 9 wherein said means of controlling the timing of each node, other than said plurality of prioritized master nodes, comprises:

means for detecting that all TPNs received by each node, other than said plurality of prioritized master nodes, are equal to or greater than said predefined maximum value;

means for selecting an internal local oscillator to provide timing for each node in response to the detection of all TPNs being equal to or greater than said predefined maximum value; and means for transmitting a TPN equal to said predefined maximum value on each of said links connected to each node in response to the detection of all TPNs being equal to or greater than said predefined maximum value.

11. An apparatus of controlling the timing of each node in a multinode system wherein a clock source in one of a plurality of prioritized master nodes provides a reference clock signal for all other nodes in said multinode system and the higher priority node of said plurality of prioritized master nodes has the higher priority number with the highest priority node having the highest priority number, comprising:

means for interconnecting each of said nodes to one or more other ones of said nodes via links;

means for transmitting clock signals between each of said nodes directly interconnected by any one of said links;

means for activating said plurality of prioritized master nodes to each provide reference clock signals for controlling the timing of said system;

means for including a timing priority number (TPN) of M*N+a−i in the clock signals sent from each of said plurality of prioritized master nodes to all of said nodes directly connected to each of said plurality of prioritized master nodes by any one of said links where a and i are predefined numbers and M is the priority number of each of said plurality of prioritized master nodes and N is equal to the number of links in the shortest path between the most distant nodes where distance is measured by counting the number of links between nodes;

means for operating all others of said nodes, other than said plurality of prioritized master nodes, that receives a TPN so that all others of said nodes alter the received TPN by subtracting the number i from the received TPN and transmit the altered TPN with clock signals to each node to which it is directly connected by any one of said links;

means for operating each node that receives more than a single TPN, other than said plurality of prioritized master nodes, to select one of said received TPNs as a preferred received TPN;

means for controlling the timing of each node, other than said plurality of prioritized master nodes, from clock signals transmitted over the link that applies the preferred TPN to said controlled node; and means for controlling the timing of each of said plurality of prioritized master nodes from clock signals transmitted over a connected link upon the TPN received from said connected link being greater than M*N+a−2*i thereby allowing the one of said plurality of prioritized master nodes having the highest priority to gain control of the timing of said multinode system.

12. The apparatus of claim 11 comprises:

means for detecting that all TPNs received by another one of said plurality of prioritized master nodes are equal to or less than a predefined minimum value thereby indicating that none of said plurality of prioritized master nodes are controlling the timing of said system; and means for providing clock signals for controlling said system by said other one of said plurality of prioritized master nodes in response to the detection that all TPNs are equal to or less than said predefined minimum value.

13. The apparatus of claim 12 wherein said means of controlling the timing of each node, other than said plurality of prioritized master nodes, comprises:

means for detecting that all TPNs received by each node, other than said plurality of prioritized master nodes, are equal to or less than said predefined minimum value;

means for selecting an internal local oscillator to provide timing for each node, other than said plurality of prioritized master nodes; and means for transmitting a TPN equal to said predefined minimum value on each of said links connected to each node, other than said plurality of prioritized master nodes.

14. A method for of controlling the timing of each node in a multinode system wherein a clock source in one of plurality of prioritized master nodes provides a reference clock signal for all other nodes in said system and the higher priority node of said plurality of prioritized master nodes has the lower priority number with the highest priority node having the lowest priority number, said method comprising the steps of:

(1) interconnecting each of said nodes to one or more other ones of said nodes via links;

(2) transmitting clock signals between each of said nodes directly interconnected by any one of said links;

(3) activating one of said plurality of prioritized master nodes to provide reference clock signals for controlling the timing of said system;

(4) including a timing priority number (TPN) of M*N+i in the clock signals sent from said one of said plurality of prioritized master nodes to all of said nodes directly connected to said one of said plurality of prioritized master nodes by any one of said links where i is a predefined number M is the priority number of said one of said plurality of prioritized master nodes and N is equal to the number of links in the shortest path between the most distant nodes where distance is measured by counting the number of links between nodes;

(5) operating all others of said nodes, other than said one of said plurality of prioritized master nodes, that receives a TPN so that all others of said nodes alter the received TPN by adding the number i to the received TPN and transmitting the altered TPN with clock signals to each node to which it is directly connected by any one of said links;

(6) operating each node that receives more than a single TPN, other than said one of said plurality of prioritized master nodes, to select one of said received TPNs;

(7) controlling the timing of each node, other than said one of said plurality of prioritized master nodes, from clock signals transmitted over the link that applies the selected TPN to said controlled node; and (8) controlling the timing of said one of said plurality of prioritized master nodes from clock signals transmitting over a connected link upon the TPN received from said connected link being less than M*N thereby allowing another one of said plurality of prioritized master nodes having higher priority to control the timing of said system upon said other one of said plurality of prioritized master nodes becoming operational.

15. The method of claim 14 wherein said step of activating said one of said plurality of prioritized master nodes, comprises the steps of:

(1) detecting that all TPNs received by said one of said plurality of prioritized master nodes are equal to or greater than a predefined maximum value thereby indicating that none of said plurality of prioritized master nodes are controlling the timing of said system; and (2) providing clock signals for controlling said system in response to the detection that all TPNs are greater than or equal to said predefined maximum value.

16. The method of claim 15 wherein the step of controlling the timing of each node, other than said plurality of prioritized master nodes, comprises the steps of:

(1) detecting that all TPNs received by each node, other than said plurality of prioritized master nodes, are equal to or greater than said predefined maximum value;

(2) selecting an internal local oscillator to provide timing for each node in response to the detection that all received TPNs are equal to or greater than said predefined maximum value; and (3) transmitting a TPN equal to said predefined maximum value on each of said links connected to each node in response to the detection that all received TPNs are equal to or greater than said predefined maximum value.

17. The method of claim 14 further comprises the step of: (1) initializing said other one of said plurality of prioritized master nodes to control the timing of said system by generating and transmitting a TPN equal to M*N+i where M is the priority number of said other one of said plurality of prioritized master nodes.

18. A method for controlling the timing of each node in a multinode system wherein a clock source in one of a plurality of prioritized master nodes provides a reference clock signal for all other nodes in said system and the higher priority node of said plurality of prioritized master nodes has the lower priority number with the highest priority node having the lowest priority number, said method comprising the steps of:

(1) interconnecting each of said nodes to one or more other ones of said nodes via links;

(2) transmitting clock signals between each of said nodes directly interconnected by any one of said links;

(3) activating said plurality of prioritized master nodes to each provide reference clock signals for controlling the timing of said system;

(4) including a timing priority number (TPN) of M*N+i in the clock signals sent from each of said plurality of prioritized master nodes to all of said nodes directly connected to each of said plurality of prioritized master nodes by any one of said links where i is predefined number and M is the priority number of each of said plurality of prioritized master nodes and N is equal to the number of links in the shortest path between the most distant nodes where distance is measured by counting the number of links between nodes;

(5) operating all others of said nodes, other than said plurality of prioritized master nodes, that receives a TPN so that all others of said nodes alter the received TPN by adding the number i to the received TPN and transmitting the altered TPN with clock signals to each node to which it is directly connected by any one of said links;

(6) operating each node that receives more than a single TPN, other than said plurality of prioritized master nodes, to select one of said received TPNs as a preferred received TPN;

(7) controlling the timing of each node, other than said plurality of prioritized master nodes, from clock signals transmitted over the link that applies the preferred TPN to said controlled node; and (8) controlling the timing of each of said plurality of prioritized master nodes from clock signals transmitted over a connected link upon the TPN received from said connected link being less than M*N thereby allowing the one of said plurality of prioritized master nodes having the highest priority to gain control of the timing of said system.

19. The method of claim 18 comprises the steps of:

(1) detecting that all TPNs received by another one of said plurality of prioritized master nodes are equal to or greater than a predefined maximum value thereby indicating that none of said plurality of prioritized master nodes are controlling the timing of said system; and (2) providing clock signals for controlling said system by said other one of said plurality of prioritized master nodes in response to the detection that all TPNs are greater than said predefined maximum value.

20. The method of claim 19 wherein the step of controlling the timing of each node, other than said plurality of prioritized master nodes, comprises the steps of:
  (1) detecting that all TPNs received by each node, other than said plurality of prioritized master nodes, are equal to or greater than said predefined maximum value;
  (2) selecting an internal local oscillator to provide timing for each node in response to the detection of all TPNs being equal to or greater than said predefined maximum value; and
  (3) transmitting a TPN equal to said predefined maximum value on each of said links connected to each node in response to the detection of all TPNs being equal to or greater than said predefined maximum value.

21. A method of controlling the timing of each node in a multinode system wherein a clock source in one of a plurality of prioritized master nodes provides a reference clock signal for all other nodes in said system and the higher priority node of said plurality of prioritized master nodes has the higher priority number with the highest priority node having the higher priority number, said method comprising the steps of:
  (1) interconnecting each of said nodes to one or more other ones of said nodes via links;
  (2) transmitting clock signals between each of said nodes directly interconnected by any one of said links;
  (3) activating said plurality of prioritized master nodes to each provide reference clock signals for controlling the timing of said system;
  (4) including a timing priority number (TPN) of $M*N+a-i$ in the clock signals sent from each of said plurality of prioritized master nodes to all of said nodes directly connected to each of said plurality of prioritized master nodes by any one of said links where a and i are predefined numbers and M is the priority number of each of said plurality of prioritized master nodes and N is equal to the number of links in the shortest path between the most distant nodes where distance is measured by counting the number of links between nodes;
  (5) operating all others of said nodes, other than said plurality of prioritized master nodes, that receives a TPN so that all others of said nodes alter the received TPN by subtracting the number i from the received TPN and transmit the altered TPN with clock signals to each node to which it is directly connected by any one of said links;
  (6) operating each node that receives more tha a single TPN, other than said plurality of prioritized master nodes, to select one of said received TPNs as a preferred received TPN;
  (7) controlling the timing of each node, other than said plurality of prioritized master nodes, from clock signals transmitted over the link that applies the preferred TPN to said controlled node; and
  (8) controlling the timing of each of said plurality of prioritized master nodes from clock signals transmitted over a connected link upon the TPN received from said connected link being greater than $M*N+a-2*i$ thereby allowing the one of said plurality of prioritized master nodes having the highest priority to gain control of the timing of said system.

22. The method of claim 21 comprises the steps of:
  (1) detecting that all TPNs received by another one of said plurality of prioritized master nodes are equal to or less than a predefined minimum value thereby indicating that none of said plurality of prioritized master nodes are controlling the timing of said system; and
  (2) providing clock signals for controlling said system by said other one of said plurality of prioritized master nodes in response to the detection that all TPNs are equal to or less than said predefined minimum value.

23. The method of claim 22 wherein the step of controlling the timing of each node, other than said plurality of prioritized master nodes, comprises the steps of:
  (1) detecting that all TPNs received by each node, other than said plurality of prioritized master nodes, are equal to or less than said predefined minimum value;
  (2) selecting an internal local oscillator to provide timing for each node, other than said plurality of prioritized master nodes; and
  (3) transmitting a TPN equal to said predefined minimum value on each of said links connected to each node, other than said plurality of prioritized master nodes.

* * * * *